United States Patent

[11] 3,633,493

| [72] | Inventor | Toivo Helminen<br>517 North Idlewild St., Kaukauna, Wis. 54130 |
|---|---|---|
| [21] | Appl. No. | 836,339 |
| [22] | Filed | June 25, 1969 |
| [45] | Patented | Jan. 11, 1972 |

[54] ROLL ASSEMBLY
4 Claims, 10 Drawing Figs.

[52] U.S. Cl..................................................... 100/162 B,
29/113 AD
[51] Int. Cl.............................................................. B30b 3/04
[50] Field of Search............................................ 100/162 B,
170, 155; 29/113, 116, 127, 126, 113 AD, 116
AD; 226/175; 19/258, 236, 65; 26/63

[56] References Cited
UNITED STATES PATENTS

| 733,264 | 7/1903 | O'Brien | 29/126 |
| 1,091,366 | 3/1914 | McHale | 29/126 UX |
| 2,648,122 | 8/1953 | Hornbostel | 29/113 |
| 2,715,024 | 8/1955 | Nydegger et al. | 29/126 X |
| 2,803,126 | 8/1957 | Meyer | 29/126 X |
| 3,043,211 | 7/1962 | Appenzeller | 100/170 |
| 3,470,948 | 10/1969 | Korsch | 29/113 AD X |

*Primary Examiner*—Dorsey Newton
*Attorney*—Dawson, Tilton, Fallon & Lungmus

ABSTRACT: A variable deflection roll wherein a shaft is mounted within a cylindrical shell eccentric to the axis of the shell and at least one resilient element, such as a inflatable rubber tire, is interposed between the exterior of the shaft and the interior of the shell; the deflection of the roll being compensated for by a combination of the pressure inside the tire or tires and the amount of eccentricity of the shaft relative to the shell axis.

INVENTOR
TOIVO HELMINEN
BY Dawson, Tilton, Fallon & Lungmus
ATT'YS

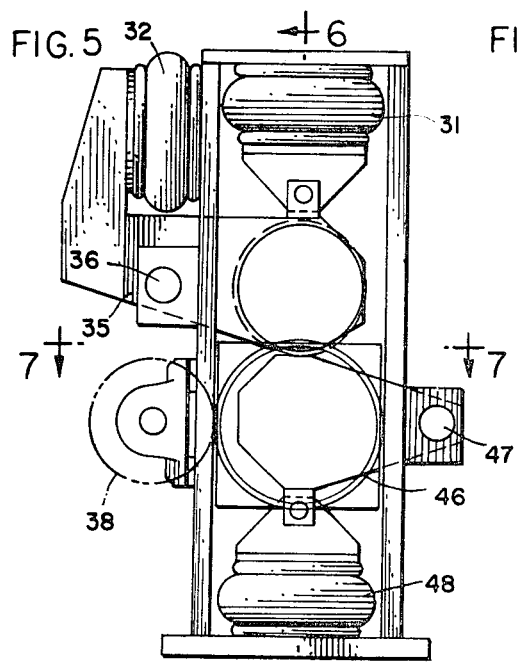
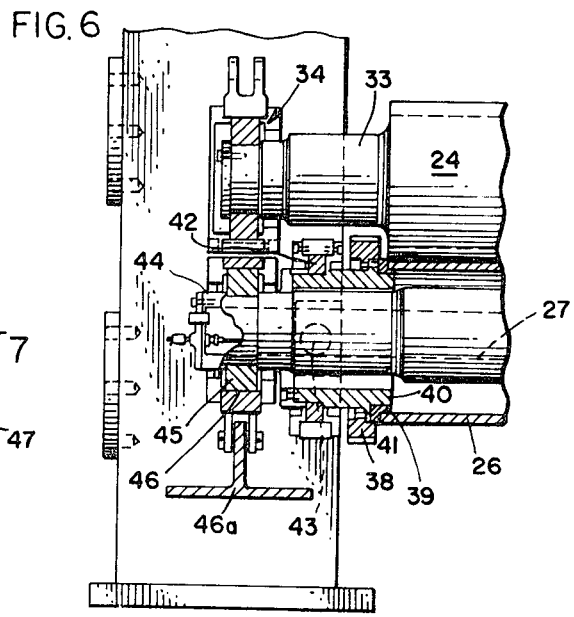
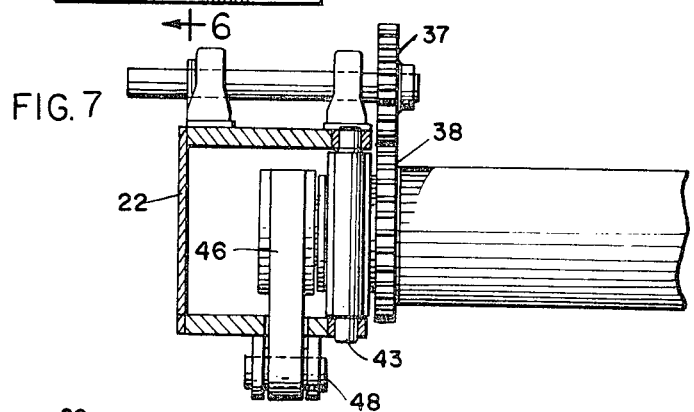
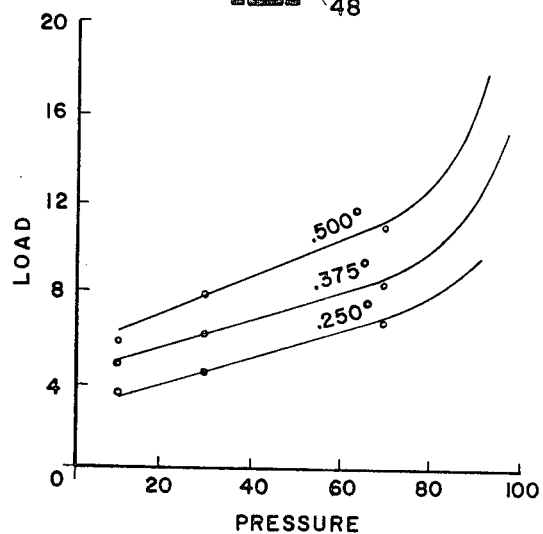
INVENTOR.
TOIVO HELMINEN

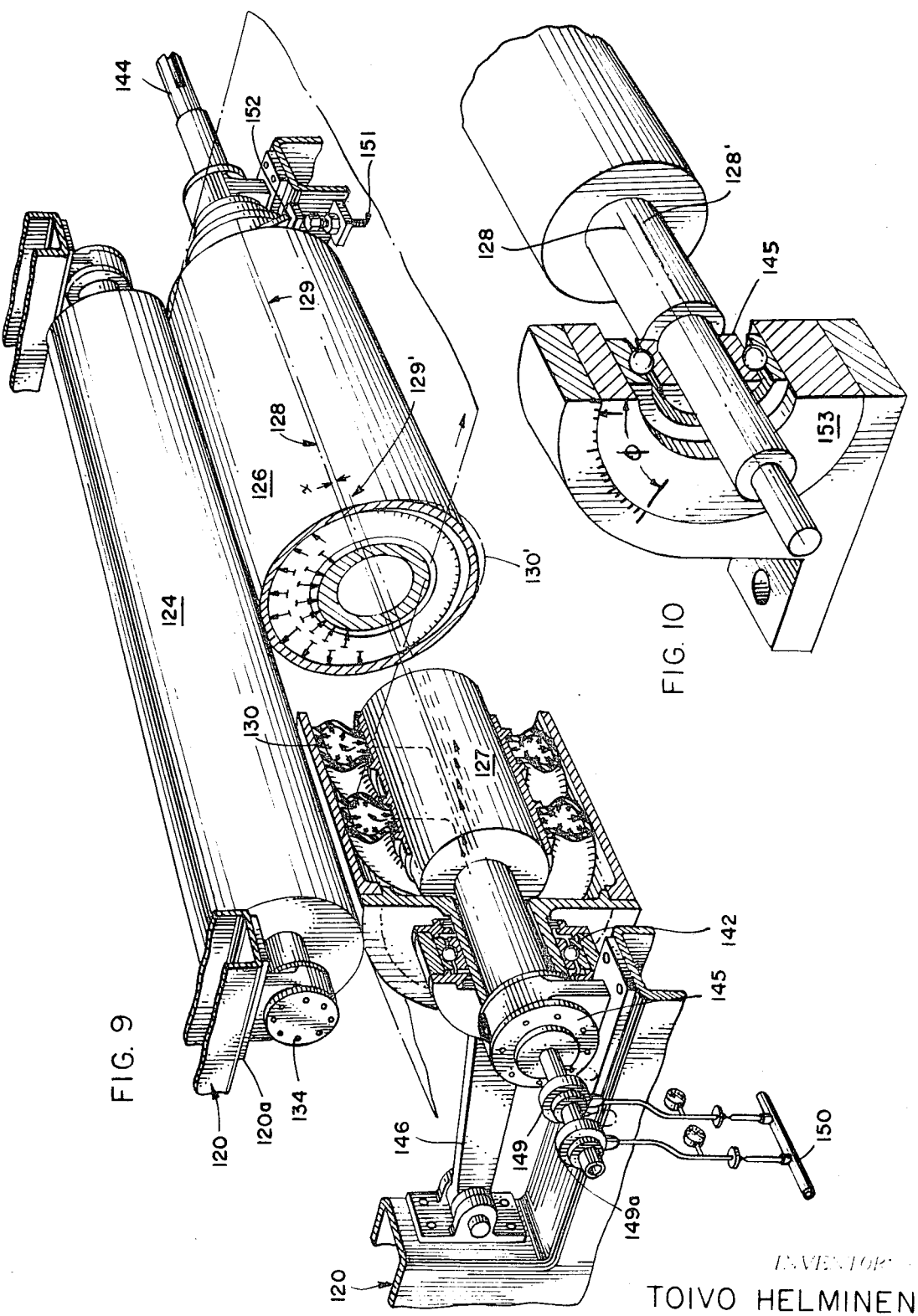

ROLL ASSEMBLY

BACKGROUND AND SUMMARY OF INVENTION

The roll assemblies with which the instant invention is concerned are used in many installations, exemplary of which are those relating to web processing. The roll assembly is either used by itself or in combination with other rolls in pressure engagement therewith. Normally the roll has a substantial face width, i.e., cylindrical length, so that its own weight may cause an unacceptable deflection. Over the years many expedients have been employed for attempting to correct this matter, but none have made use of a shaft mounted eccentrically relative to the shell axis.*(*Exemplary of the prior art are U.S. Pat. Nos. 2,648,122 and 3,425,642.)

DETAILED DESCRIPTION

The invention is described in conjunction with the accompanying drawing, in which:

FIG. 5 is an enlarged side elevational view of one end of the machine of FIG. 1;

FIG. 6 is a sectional view taken along the line 6—6 of FIG. 5;

FIG. 7 is a fragmentary transverse sectional view taken along the line 7—7 of FIG. 5;

FIG. 8 is a chart showing the interrelationship of roll loading (in 100 lbs.) with tire pressure (p.s.i.g.) and amount of eccentricity (inches);

FIG. 9 is a fragmentary perspective view of a modified form of the invention; and FIG. 10 is a fragmentary perspective view on an enlarged scale of the left hand bearing portion of FIG. 9.

Figure 1:
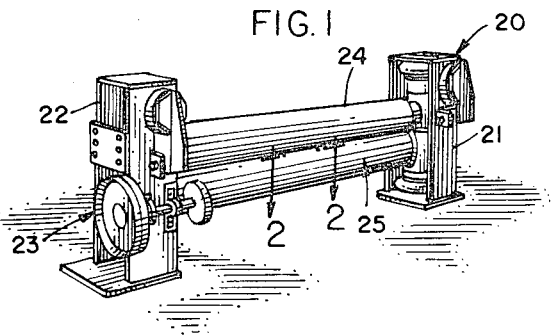
FIG. 1 is a perspective view of a roll assembly constructed in accordance with the teachings of the invention.

Referring now to FIG. 1, the numeral 20 designates generally a roll assembly which can be used in the processing of flexible webs such as paper. The machine 20 includes side frames 21 and 22 which are essentially identical, except for being right and left hand and except for the fact that the frame 22 provides means for mounting a drive generally designated 23. Supported within the side frames 21 and 22 for rotation area top roll 24, which, in the illustration given, is rubber covered, and a variable deflection roll generally designated 25.

Figure 2:
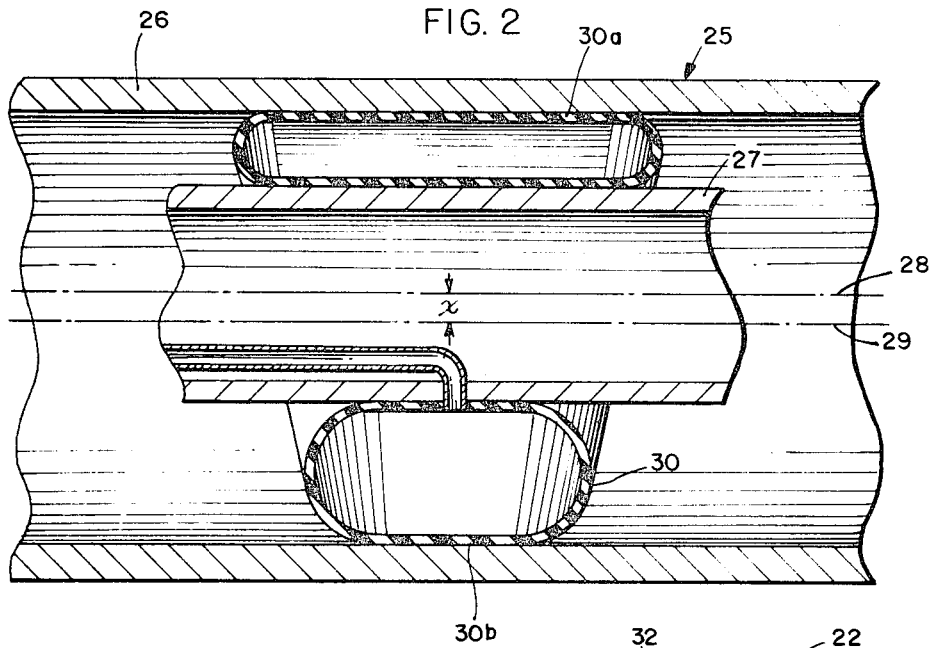
FIG. 2 is a fragmentary sectional view on an enlarged scale such as would be seen along the sight line 2—2 applied to FIG. 1.

The roll 25 can be seen in enlarged essentially schematic representation in FIG. 2. The roll 25 includes a relatively rigid cylindrical outer shell 26, advantageously constructed of steel, and a relatively rigid inner shaft 27 which may be hollow. The invention resides, in part, in mounting the cylindrical shaft 27 with its axis designated 28 eccentric to the axis 29 of the shell 26, the degree of eccentricity being designated by the symbol $x$ in FIG. 2. Interposed between the exterior of the shaft 27 and the interior of the shell 26 is a resilient element 30 which, as will be brought out hereinafter, may take the form of a rubber tire filled with a pressure fluid such as air (compare, for example, the elements 130 in FIG. 9). It will be appreciated that the showing in FIG. 2 is exaggerated to convey the principle of operation of the invention. For example, where the resilient element 30 is a hollow annulus filled with pressure fluid, it is understood that the pressure is the same at all points within the annulus. HOwever, with the greater surface area developed by "squashing" of the upper annulus part 30a relative to the lower annulus part 30b, a greater force is exerted against certain portions of the shell 26 so as to minimize or, more properly, vary the deflection therein.

The extent of compensation for variation can be appreciated from the values set forth in the chart provided as FIG. 8 herein. Deflection is expressed in terms of hundred pounds of loading of the shell wall, this being expressed as the ordinate while the abscissa is the internal pressure within the resilient element 30. Yet another parameter is the amount of eccentricity, and the three curves correspond to eccentricity amounts of 0.250 inches, 0.375 inches, and 0.500 inches respectively. In the normal operation of the invention, it is contemplated that the variation of loading, i.e., variation of deflection compensation, will be achieved through variation of internal pressure for a given eccentricity setting. This is much more amenable to close control, although close control over the eccentricity can be achieved by many means, i.e., a jackscrew as contrasted to the fluid pillows provided herein as at 48 (see FIG. 4).

In the embodiment of the invention depicted in FIGS. 1–7, the variation of the eccentricity is provided by moving the shaft while maintaining the shell 26 with a fixed axis (taking into account the normal deflection of the axis due to loading). On the other hand, the showing in FIG. 9 has the shell 126 swingable so as to shift its axis relative to a fixed axis for the shaft 127. Also provided in the machine detailed in FIGS. 1–7 are means for varying the loading on the backing roll 24, these including rubber bags inflatable with pressure fluid and designated by the numerals 31 and 32.

The rubber covered press roll 24 is seen to have a stub shaft extension 33 (see FIG. 6) which is carried, at each end of the roll 24, in an antifriction bearing generally designated 34. The antifriction bearing in turn is provided as part of a pivot arm 35 (see FIG. 5) which operates around a pivot 36 under the influence of the inflatable bags 31 and 32. Thus, the rubber covered backing roll 24 may be positioned in various relationships relative to the shell 26. It will be appreciated that the invention is useful with or without such a backing roll, and, for example, may be employed in combination with a number of rolls as, for example, the ink applying unit of a press where variable deflection is desired. It is known that the ink in a nip defined by a fountain roll and an anilox roll develops a hydraulic wedging action at increased speeds, causing undesirable roll deflection and resulting in loss of control of the film thickness. Thus, the anilox roll of a printing press which is interposed between a fountain roll and a plate roll may be advantageously constructed according to the invention to compensate for this phenomena.

Figures 3, 4:
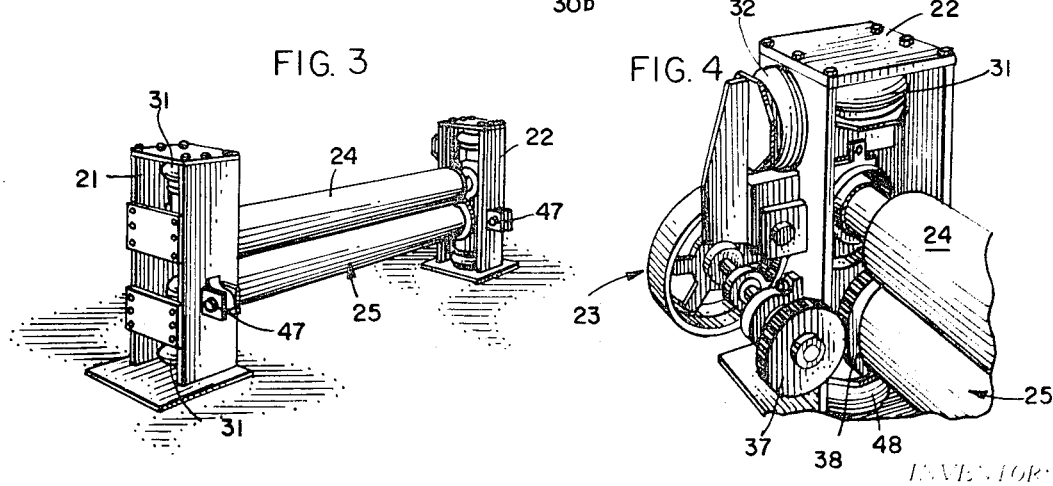
FIG. 3 is a view of the same machine seen in FIG. 1, but from the reverse side.
FIG. 4 is an enlarged perspective view of the rear end of the machine seen in FIG. 1.

In the illustration given in FIGS. 1–7, the shell 26 is the driven element of the combination—this by virtue of the drive 23 which operates through spur gears 37 and 38 (see FIG. 4). For this purpose, the shell 26 (see FIG. 6) is equipped with an integral insert extension 39 to which a header 40 is bolted by means of bolts 41, these also being responsible for securing gear 38 to the header 40. The header 40 in turn is carried by a circular antifriction bearing 42. The antifriction bearing 42 in turn is trunnion mounted as at 43, so as to permit the shell 26 to deflect without stressing the antifriction bearing 42.

The shaft 27 has an extension at each end, as at 44, which is carried in a circular antifriction bearing 45. In turn, the antifriction bearing 45 is carried by a pivot arm 46 (see particularly FIG. 7), the arm 46 being pivotally mounted on the frame about a pivot shaft 47 (see particularly the perspective showing in FIG. 3). Thus, the shaft is enabled to move up and down under the loading effected by the inflatable bags 48 which operate against the pivot arm 46 via the connection 46a (see FIG. 6).

In the operation of the embodiment depicted in FIGS. 1–7, the position of the shaft 27 relative to the shell 26 is controlled by the loading of the lower inflatable bags 48 and further variation of the deflection compensating pressure is effected by selectively inflating one or more of the resilient elements 30. For example, in FIG. 9, two tires are shown interposed between the shaft 127 and the shell 126. Means for selectively inflating these elements are provided in the form of pressure couplings as at 149, 149a, etc., to which pressure fluid such as air is delivered by manifold 150. Utilization of a selective pressure system such as this makes it possible to differentially inflate the resilient elements and thereby achieve a fine degree of variation in the roll deflection.

Returning now to the embodiment of the invention seen in FIGS. 1–7, a specific embodiment of the shell 26 includes a steel roll having a face width of 80 inches, an inside diameter of 7.75 inches and an outside diameter of 8.75 inches. The steel shaft 27 has a total face width of 99 inches, including shaft extensions, the operational portion of the shaft for carrying the resilient element 30 measuring 77½ inches. The diameter of the intermediate 77½ inches width section is 5.0 inches O.D., with an inside diameter of 2½ inches for the receipt of piping, etc.

In FIG. 9, the frame is designated generally by the numeral 120 and is seen to support the stationary press roll 124. Suitable shims or jackscrews may be employed at 120a to precisely locate the bearing housing 134.

Another portion of the frame 120 pivotally supports the shell 126, more precisely the bearing 142, through the use of a swing arm 146. A similar arm is provided on the right side, i.e., the drive side, by virtue of suitable gearing on shaft 144, constituting an extension of the shaft 127.

The numeral 128 designates the centerline of the stationarily mounted drive shaft 127, while the numeral 129 designates the centerline of the shell 126 when the latter is under pressure from the tires 130. The numeral 129' designates the centerline of the shell 126 when there is no pressure in the tires 130 and wherein the arms 146 have moved the shell 126 to its lowermost position; the extent of movement is illustrated by a broken line designated 130'. Stop screws 151 restrict the extent of movement by engaging lugs 152 on the extremities of shell 126.

In FIG. 10, means are illustrated for varying the angle of eccentricity, through the angle $\phi$. The bearings 145 for the shaft 127 include an eccentric collar 153 which may be rotated to develop an eccentricity at an angle to the vertical. This may be advantageous to compensate for the horizontal component of deflection developed by driving all three rolls (124, 126, and 127, or 24, 26, and 27) from a common drive. In the showing of FIGS. 1–7, the shell 26 drives all three rolls, while in FIGS. 9–10 the shaft 127 does the driving. After opening the split housing of bearing 145, and by rotating the collar 153 through the arc shown, the shaft centerline can be translated from the 128 position to that of 128'.

I claim:

1. In roll apparatus having a frame, a roll assembly comprising a cylindrical outer shell having an axis of rotation and mounted on said frame, a shaft within said shell mounted on said frame independently of said shell and having an axis of rotation parallel to but eccentric relative to the shell axis, a plurality of annular resilient elements spaced along said shaft between said shell and shaft and coupling the same together, means operably associated with said assembly for selectively inflating said resilient elements, and means for rotating said assembly.

2. A roll assembly comprising a cylindrical outer shell having an axis of rotation, a shaft within said shell and having an axis of rotation parallel to but eccentric relative to the shell axis, at least one resilient element between said shell and shaft, means for rotating said assembly, and means operably associated with said roll assembly for varying the eccentricity of said shaft axis relative to said shell axis.

3. In roll apparatus having a frame, a roll assembly comprising a cylindrical outer shell having an axis of rotation and mounted on said frame, a shaft within said shell mounted on said frame independently of said shell and having an axis of rotation parallel to but eccentric relative to the shell axis, at least one resilient element between said shell and shaft and coupling the same together, means for rotating said assembly, said resilient element being a hollow annulus filled with a pressure fluid, means operably associated with said assembly for varying the pressure, and means operably associated with said assembly for varying the eccentricity of the shaft axis relative to the shell axis.

4. A roll assembly comprising a frame, a roll mounted on said frame for rotation therein and a roll assembly also mounted on said frame in parallel contacting relation with the first-mentioned roll, said roll assembly including a cylindrical outer shell having an axis of rotation parallel to but eccentric relative to the shell axis, at least one resilient element between said shell and shaft, means for rotating said assembly, and means operatively associated with said frame for varying the angle between the line joining the axes of rotation of the shaft and shell and the line joining the axis of rotation of the shell and first mentioned roll.

* * * * *